United States Patent Office 3,408,253
Patented Oct. 29, 1968

3,408,253
TACKIFYING EPDM RUBBERS USING A CEMENT COMPRISING EPDM AND A PHENOL-TERPENE-CYCLIC POLYENE RESIN
Charles F. Eckert, Wayne, N.J., and Edwin S. English, Grosse Pointe Woods, Mich., assignors to Uniroyal, Inc., a corporation of New Jersey
No Drawing. Filed Apr. 5, 1965, Ser. No. 445,699
17 Claims. (Cl. 161—253)

ABSTRACT OF THE DISCLOSURE

Tackifier and bonding cement for EPDM stock comprising (A) EPDM, (B) compounding and vulcanizing ingredients for said EPDM and (C) a resinous reaction product of a phenol, a terpene and a cyclic polyene having been added last.

This invention relates to tackifying and bonding sulfur-vulcanizable ethylene-propylene-polyene terpolymer rubbers, now known as "EPDM" rubbers. It resides in a novel tackifying and bonding cement for such rubbers, a novel method of tackifying stocks made from such rubbers and effecting excellent bonding of such stocks before, during and after vulcanization to form a composite structure exhibiting great resistance to separation, and in the resulting vulcanized composite which can take the form of or be embodied in any useful article of manufacture adapted to be made from or to embody such terpolymer rubbers. Thus the article can be a fabric-reinforced pneumatic tire (either entirely new or retreaded), a conveyor belt, an article of footwear or any other rubber article adapted to be manufactured by vulcanizing juxtaposed stocks of sulfur-vulcanizable EPDM rubbers.

This invention is based on the discovery that sulfur-vulcanizable EPDM rubber stocks can be tackified so as to have remarkably good building tack and that bodies or layers of such terpolymer stocks so tackified can be bonded together by vulcanization in the conventional manner to yield a composite structure exhibiting outstanding adhesion at the interface, commonly referred to as cured adhesion, by the use of the novel tackifying and bonding cement described herein.

It is important to note that good tackifying is useless unless accompanied by good cured adhesion in the vulcanized article. Thus good tackifying properties without good cured adhesion are entirely inadequate. In this invention both requisities are achieved in a simple manner with a single cement composition. In cured products made according to the invention the strength of the bonding layer is comparable with that of the stocks bonded together by the curing step and in many instances the resulting assembly exhibits failure in one or the other of the stocks when the composite structure is subjected to a force applied so as to tend to separate the stocks along the line of the bond.

The sulfur-vulcanizable EPDM rubber stocks joined in the practice of the invention can be made with any of the EPDM terpolymers known to the art. These terpolymer rubbers are terpolymers of ethylene, propylene and a non-conjugated polyene. The polyene is usually a diene or a triene. The manufacture of these terpolymer rubbers is well-known to those skilled in the art. The polyenes are usually polyunsaturated monocyclic, bicyclic, tricyclic or acyclic hydrocarbons. In such terpolymers the non-conjugated polyene usually ranges from 0.5 to 15 percent of the weight of the terpolymer, and the ethylene-to-propylene weight ratio usually ranges from 20:80 to 75:25.

Examples of terpolymer rubbers which may be used in the stocks being joined and in our novel tackifying and bonding cement are given in U.S. Patents 2,933,480; 3,000,866; 3,063,973; 3,093,620; 3,093,621 and 3,136,739, in British Patent 880,904, and in Belgian Patent 623,698. The polyenes most commonly used in such terpolymers in present commercial practice are dicyclopentadiene (more accurately termed cyclopentadiene dimer), 1,4-hexadiene, methylenenorbornene and 1,5-cyclooctadiene. Other polyenes which can be used include alloocimene, methyl cyclopentadiene dimer, etc. Terpolymers made with dicyclopentadiene are exemplified in U.S. 3,000,866 and 3,136,739 and in British Patent 880,904. The use of 1,4-hexadiene is exemplified in 2,933,480. The use of methylenenorbornene (actually 5-methylene-2-norbornene) is exemplified in U.S. 3,093,621. The use of 1,5-cyclooctadiene is exemplified in Belgian Patent 623,698. Examples of such commercial terpolymers are those available under the trademarks "Royalene," "Nordel," "Enjay EPT" and "Dutral S70" made with dicyclopentadiene, 1,4-hexadiene, methylenenorbornene and 1,5-cyclooctadiene, respectively, as the third monomer.

The cured adhesion is greatest when EPDM rubbers made with the same third monomer are used in the cement and in the stocks being joined. If the EPDM rubber in the cement is made from a third monomer different from that in the stocks being joined, the tack will be satisfactory but cured adhesion is likely to be somewhat reduced. Nevertheless, using the present invention it is perfectly feasible to manufacture an excellent pneumatic tire in which EPDM stocks made with different third monomers (polyenes) are joined; an example is a tire made from a carcass formed from fabric skin-coated with "Nordel" brand of EPDM rubber to which is bonded a tread and sidewalls formed from appropriately compounded "Royalene" brand of EPDM rubber.

The terpolymer rubber stocks to be joined are compounded in the conventional manner known in the art. In this regard the statements made below concerning the compounding of the terpolymer rubber stock incorporated in the cement are applicable.

The novel tackifying and bonding cement comprises (A) an unvulcanized sulfur-vulcanizable ethylene-propylene terpolymer rubber of the type described above, (B) compounding and vulcanizing ingredients for the terpolymer rubber, and (C) a novel resin disclosed in copending application Ser. No. 445,779 filed of even date herewith in the name of Carlos T. Gonzenbach (which is hereby expressly incorporated herein by reference), in a volatile organic solvent for the rubber and the resin. This resin is the reaction product of (1) phenol or an alkyl substituted phenol, or mixtures thereof, (2) a terpene, and (3) a cyclic polyene, other than reactant 2 (i.e., other than a terpene), which polyene is either a monocyclic or a polycyclic hydrocarbon having at least two non-conjugated double bonds. The following information concerning the method of preparation of the resins is taken from the aforementioned Gonzenbach application.

The phenolic reactant (reactant 1) should have at least one ortho or para position open and preferably has at least two such positions open. The most preferred phenol is phenol per se. Other phenols which can be used include o-cresol, m-cresol, p-cresol, cresylic acid having a boiling range of 185–230° C., 2,5-xylenol, 3,5-xylenol, p-dodecylphenol, p-tert-butylphenol, p-tert-amylphenol, o-tert-butyl-phenol, o-sec-butylphenol, p-ethylphenol, o-isopropylphenol, o-cyclohexylphenol, p-cyclohexylphenol, p-hexylphenol, p-octadecylphenol. As reactant 2 there can be used any of such terpenes as alpha-pinene, beta-pinene, d-limonene, alpha-terpineol (which reacts like a terpene hydrocarbon although it is an alcohol), delta-3-carene, etc., mixtures of terpenes such as a mixture of alpha-pinene and betapinene.

As reactant 3 there can be used such unsaturated aliphatic hydrocarbons as dicyclopentadiene, methylcyclopentadiene dimer, vinylcyclohexenes, e.g. 4-vinylcyclohexene and 3-vinyl-cyclohexene, bicycloheptadiene, cyclododecatriene, cyclooctadiene, e.g. 1,5-cyclooctadiene, cyclooctatriene, cycloheptadiene, cyclopentadiene and methylcyclopentadiene.

The interaction of the three reactants is generally carried out in a solvent, in the presence of a Friedel-Crafts catalyst. The Friedel-Crafts catalyst can be an acid such as hydrofluoric acid, sulfuric acid or phosphoric acid or it can be a Lewis acid such as aluminum chloride, aluminum bromide, boron trifluoride, boron trifluoride etherate, antimony pentachloride, antimony trichloride, ferric chloride, tellurium chloride, beryllium chloride, stannic chloride, titanium tetrachloride, bismuth chloride, zinc chloride, aluminum iodide. The preferred catalyst is boron trifluoride.

The phenol (reactant 1) is preferably employed in an amount of 1 to 3 moles per 5 moles of cyclic compound (reactant 3), e.g. dicyclopentadiene. However, as little as 0.1 mole of phenol can be used per 5 moles of reactant 3 and there can also be employed more than 3 moles of the phenol, e.g., up to 5 moles per 5 moles of reactant 3.

The terpene is preferably employed in an amount of 1 mole per mole of cyclic compound (reactant 3). The mole ratio of terpene to cyclic compound, however can be varied, e.g., from 1:5 to 5:1.

The Friedel-Crafts catalyst can be used in an amount of 0.1–2 moles, or even more, per 5 moles of cyclic compound (reactant 3).

Generally, the resin-forming reaction is carried out in a solvent, e.g., aromatic hydrocarbons, aliphatic hydrocarbons and naphthenes. Illustrative hydrocarbon solvents are benzene, toluene, xylene, heptane, hexane, octane, petroleum ether, cyclohexane, tetrahydronaphthalene (Tetralin), decahydronaphthalene (Decalin), trimethyl benzene, cycloheptane, tetramethylbenzene, cumene, nonane, decane, cymene, ethylbenzene. Chlorinated aromatic hydrocarbons, e.g., chlorobenzene and dichlorobenzene, can also be used as solvents. The amount of solvent is not critical and usually is from 0.5 to 8 times the total weight of the reactive monomers. Preferably the solvent is used in an amount in excess of the reactive monomers by weight. The hydrocarbon solvents usually are those which boil between 40° C. and 205° C.

When xylene is employed as the aromatic solvent it sometimes takes part in the reaction with the cyclic polyolefin to act as a chain terminator. Toluene will act in the same fashion but to a lesser extent. Benzene is completely inert. When the yield of resin is over 100% based on the reactants, this is due to the fact that the xylene takes part in the reaction. This xylene modification is particularly pronounced when bicycloheptadiene is employed as reactant 3.

The reaction temperature used in making the resin can be widely varied, e.g., from −10° to +100° C. Usually it is between +10° and 70° C. The temperature should be such that the solvent is liquid and the reaction mixture is kept liquid. The temperature need not be above the boiling point of the reaction mixture.

The resinous products are generally solid at room temperature although in a few instances they are liquid.

The following Examples A through F give the details of preparation of resins A through F, respectively, of the numbered working examples of the practice of our invention given below. Unless otherwise indicated, all parts and percentages are by weight. All softening points were determined by the ring and ball method. The yield is expressed in weight percent based on the three reactive monomers 1, 2 and 3.

General procedure used in Examples A through F

Eight moles of xylene and 1.25 moles of phenol were charged to the reaction vessel and heated to 40–45° C., whereupon 0.5 mole of boron trifluoride was bubbled through a subsurface sparger into the mixture while the temperature was held at 40–45° C. Then the indicated amount of reactant 2 was added dropwise while the temperature of the mixture was maintained at 40–45° C. Then the indicated amount of reactant 3 was added dropwise while the temperature was held 40–45° C. Active agitation was maintained throughout the entire reaction. After a two-hour total reaction time, the reaction was stopped by adding an excess of water to the reaction mixture. The reaction mixture was then heated to 80–85° C. with active stirring for 30 minutes. Agitation was then stopped and the water layer separated. A second water wash followed. The washed polymerizate was then steam hardened to the desired softening point.

In the table the following abbreviations are used:

α-p for alpha-pinene
β-p for beta-pinene
d-l for di-limonene
DC for dicyclopentadiene
BC for bicycloheptadiene

TABLE

| Example | Monomers (moles) | | | Percent Yield | Softening Point, °C. |
|---|---|---|---|---|---|
| | A (phenol) | B | C | D | | |
| A | 1.25 | α-p 4 | β-p 1 | DC 5 | 87 | 94 |
| B | 1.25 | | β-p 5 | DC 5 | 82 | 112 |
| C | 1.25 | α-p 5 | | DC 5 | 102 | (¹) |
| D | 1.25 | | d-l 5 | DC 5 | 88 | 72 |
| E | 1.25 | | β-p 5 | BC 5 | 117 | 93 |
| F | 1.25 | | d-l 5 | BC 5 | 109 | 74 |

¹ Liquid.

When mixtures of alpha-pinene and beta-pinene are employed as the terpene reactant, in general the greater the proportion of beta-pinene the higher the softening point of the resin formed, providing the proportions of phenol and the cyclic polyene are kept constant.

In preparing the cement, we usually first form a terpolymer rubber stock embodying the terpolymer and compounding and vulcanizing ingredients therefor. The compounding and vulcanizing ingredients are so chosen and are used in such amounts as to effect vulcanization of the terpolymer to a vulcanizate having good properties; the selection of these ingredients and the determination of the amounts used are in accordance with principles well-known to those skilled in the art of compounding and vulcanizing EPDM rubbers and detailed discussion of such principles herein would be superfluous. Usually the terpolymer stock thus prepared contains conventional loadings of fillers or pigments such as reinforcing carbon black, white fillers or pigments such as silica, calcium silicate or lignin, or colored fillers or pigments. The stocks often contain conventional amounts of extending oil.

In preparing the cement the compound terpolymer rubber stock and the resin are dispersed in a suitable volatile organic solvent in the obvious manner whereby the terpolymer and the resin are dissolved and the other materials in the terpolymer stock are dissolved or dispersed in the solvent according to their solubilities. The terpolymer rubber and the resin are usually present in the cement in such relative proportions as to give a weight ratio of resin to terpolymer rubber hydrocarbon of from 0.1:1 to 5:1. The use of the terpolymer rubber and compounding and vulcanizing ingredients therefor in the cement is an essential feature of our invention; this is shown by the fact that use of a solution of the resin alone in the solvent as a wash for the EPDM surfaces to be joined is completely ineffective in giving the necessary tack.

Our novel cement is usually so formulated as to contain from 5 to 20 parts by weight of total solids per 100 parts of the cement. Up to a certain limit the higher the total solids the higher the tack; an upper limit on total solids is imposed by the fact that tack and/or cured adhesion are seriously reduced if the total solids is too high.

The volatile organic solvent used as the vehicle in the cement can be any liquid having the requisite power of dissolving the terpolymer rubber and the resin and having appropriate volatility. Examples are cyclohexane, gasoline, trichloroethylene, tetrachloroethylene, etc.

In practicing the invention we simply apply a thin layer of the cement in any suitable way on one or both surfaces of terpolymer rubber stock to be joined, allow a considerable portion of the solvent to evaporate from the coated surface or surfaces, and then bring the two surfaces together with suitable pressure and subject the assembly to vulcanization in the known manner.

In practicing the invention we are not limited to joining two unvulcanized EPDM stocks. On the contrary one of the stocks being joined may already be vulcanized. Thus, the invention can be used for the retreading of EPDM rubber tires with tread rubber (so-called camelback) made from EPDM rubber; in that case, of course, the tire being retreaded is already vulcanized and the tread rubber is unvulcanized. The tire to be retreaded is prepared for retreading in the usual way by grinding off the old tread. The cement is applied to the vulcanized surface or to the unvulcanized surface or to both surfaces prior to bringing them together and vulcanizing the bonding layer and the unvulcanized stock. Excellent tackification and cured adhesion of the tread to the tire are thus achieved.

Furthermore, as will be obvious to those skilled in the art, we are not limited to joining separate bodies of EPDM rubber stocks. In other words, we can join portions of a single body of such stock. This would apply in the manufacture, for example, of an endless item, e.g., an endless gasket, from such a terpolymer stock by interposing the cement between the ends of a section of such stock, bringing the ends together, and vulcanizing.

The following examples illustrate the practice of the invention using the six resins A to F described above. In these examples all parts are by weight.

The values given for tack were determined with a tackmeter instrument utilizing a system of two pivoted arms which allowed the contacting and separation of two uncured samples (strips of a size ¼ x 1½ inches cut from a calendered sheet of stock 0.175 inch thick) of cemented EPDM rubber stock under constant and known forces. Weights were used to supply the constant contacting and separation forces to the lever arms via a system of pulleys. The sample pieces were placed in holders on the free ends of the pivoted arms in such a manner as to give a constant area of contact, this being achieved by positioning the held samples at right angles to one another. The assembly was associated with a timer system which effectively controlled contact time and recorded the time required for separation under a given load.

Some variation in tack values of a sample is present from day to day; however, the magnitude of the relative difference between two different cements remains constant. Use of a suitable control makes the instrument a dependable measure of tack. In the examples below the tack values are expressed as relative tack referred to the value of 100 for Royalene stocks (as defined in each example) tackified with a cement containing equal parts of the Royalene stock and the resin at 13.3% total solids in cyclohexane.

The dynamic adhesion test was carried out on the apparatus described by F. H. D. Akkerman in the Journal of Applied Polymer Science, Vol. 7, page 1425 (1963), without the photographic equipment. The machine exerts a rapidly repeated straight pull on a rubber sample fixed in the jaws. To prepare the sample, two slabs of the vulcanizable rubber stocks to be adhered together, measuring about 4 x 4 inches in area and from 0.1 to 0.2 inch in thickness, are cut from calendered sheet and one is superposed on the other, a sheet of plastic film, such as Mylar polyester, being inserted between them over about one-half of their area. The directly contacting faces of the rubber pieces are first coated with an adhesive composition when it is so desired. Pieces of fabric are then laid against the top and bottom outer faces of the slabs. The composite is placed in a platen mold and vulcanized under heat and pressure. The vulcanized composite is then cut into strips 1 x 4 inches in such direction that half of each strip contains the plastic release sheet. The ends of the strip can then be pulled apart so that the sample has two legs joined to a unitary body of rubber, half the length of the sample, in which the two rubber stocks have become integrally united. The legs of the sample are clamped into the two sample-holding jaws of the machine at a constant predetermined distance from the line of partition between the two legs of the sample. The clamped sample is then pre-heated 15 minutes at the temperature of the test. The sample holder is then mounted in the oven of the machine maintained at the desired temperature, balanced inertia weights are applied, and the cam-operated oscillation is started, as described by Akkerman. A dial-type thickness gauge is mounted on the machine in such manner as to permit a direct measurement of changes in the distance between the upper and lower sample jaws. The change in position of the lower jaw affords a measure of the resistance of the adhering rubber stocks to a separating pull. The data are here reported in terms of the jaw separation expressed as inches per minute at a temperature of 120° C.

Example 1

Sixty parts of EPDM rubber stocks having the following formulations:

|  | Royalene [1] stock | Nordel [2] stock |
|---|---|---|
| Rubber | 100 | 100 |
| SAF carbon black | 80 | 80 |
| Circosol 2XH hydrocarbon extending oil | 50 | 50 |
| Zinc oxide | 5 | 5 |
| Stearic acid | 1 | 1 |
| MBT (mercaptobenzothiazole) | 0.5 | 0.5 |
| Tetramethylthiuram monosulfide (Monex) | 1.5 | 1.5 |
| Sulfur | 1.0 | 1.5 |
| Compounded Mooney (ML-4 at 212° F.) | 85 | 71 |

[1] (Registered trademark). The particular "Royalene" used in this example was an EPDM rubber made with dicyclopentadiene as the third monomer and had a Mooney (ML-4 at 212° F.) viscosity of 125, an iodine number of 13, and an ethylene-propylene weight ratio of 67:33.
[2] (Registered trademark). The particular "Nordel" used in this example was an EPDM rubber made with 1,4-hexadiene as the third monomer, and had a Mooney (ML-4 at 212° F.) viscosity of 74, an iodine number of 13, and an ethylene-propylene ratio of 57:43.

were shaken overnight with 60 parts of Resin A above prepared from phenol, alpha-pinene, beta-pinene and dicyclopentadiene, in 780 parts of cyclohexane. The mixtures were then further dispersed in the solvent by rapid mixing, as with a homogenizer. The products were smooth, black liquids of an easily pourable viscosity.

The tackifier cements were painted on unvulcanized EPDM stocks having the formulations just given. After two hours' drying, tack was measured on the tackmeter as described above. Cured adhesion pads were made and tested as described above. The data obtained are presented below.

|  | Cement formulation | |
|---|---|---|
|  | A | B |
| Royalene [1] rubber stock | 60 |  |
| Nordel 1070 [2] rubber stock |  | 60 |
| Resin A | 60 | 60 |
| Cyclohexane | 780 | 780 |
| Relative Tack (under load of 600 g.): |  |  |
| On Royalene stock | 100 | 24 |
| On Nordel stock | 197 | 75 |
| Separation Rate (inch/min.): |  |  |
| On Royalene stock | .014 | .026 |
| On Nordel stock | .20 | .010 |

For footnotes see table of Example 1.

It will be seen that where the same EPDM rubber is used in the cement and in the two stocks being joined excellent tack and cured adhesion are obtained, but where the EPDM in the cement differs from that in the stocks being joined the cured adhesion is reduced.

Example 2

The advantages of the cement described in Example 1A (cement E in this example) over prior art tackifiers are illustrated in the data below.

|  | Cement formulation | | | | |
| --- | --- | --- | --- | --- | --- |
|  | A | B | C | D | E |
| Royalene stock (same as in Example 1A) | 10 | 10 | 10 | 10 | 10 |
| Resin (10 parts) | Union Carbide CRR-0707 | Union Carbide CRR-0709 | Union Carbide CRR-0909 | Amberol ST137X | Resin A above |
| Cyclohexane | 136 | 136 | 136 | 136 | 136 |
|  | Tackmeter values | | | | |
| Relative Tack (under 600 g. load) on Royalene stock of Example 1 | 0 | 42 | 0 | 0 | 100 |

Although cement B made with resin CRR-0709 gave measurable tack, the separation rate was infinite indicating zero cured adhesion.

Resins CRR-0707, CRR-0709 and CRR-0909 are alkylphenolformaldehyde-based resin recommended for tackifying EPDM rubber in Rubber Age, February 1963, pp. 745-8 and Rubber World, March 1964, p. 101. Amberol ST137X is an alkylphenol-formaldehyde resin recommended for tackifying EPDM in Rubber World, March 1963, pp. 52-9.

Example 3

The following data show the effect on tack of variation of total solids and of resin-to-rubber ratio in the cement.

|  | Cement formulation | | | | | | | |
| --- | --- | --- | --- | --- | --- | --- | --- | --- |
|  | A | B | C | D | E | F | G | H |
| Royalene stock (same as in Example 1A) | 6 | 4 | 2 | 6 | 8 | 2 | 6 | 10 |
| Resin B above | 6 | 4 | 2 | 4 | 4 | 4 | 8 | 10 |
| Cyclohexane | 78 | 78 | 78 | 78 | 78 | 78 | 78 | 78 |
|  | Tackmeter values | | | | | | | |
| Relative Tack (600 g. load) on Royalene stock of Example 1 | 100 | 28 | 0 | 21 | 15 | 46 | 86 | 0 |

Although the relative tack values for cements C and H given in the data are numerically zero, it will be understood that these data were obtained using a particular separating load and under the particular conditions of temperature and humidity prevailing at the time. Under a lesser load positive values for relative tack would be obtained. Cements A, B, C and H show that for equal parts of resin and rubber there is an optimum total solids level for maximum tack. Cements B, D, E and F show that for a constant level of resin, descreasing the ratio of resin to rubber decreases tack. Cements A, D, and G show that for a given level of rubber stock there exists an optimum level of resin to yield optimum tack. This example shows that the total solids content and the resin-to-rubber ratio can be varied to adjust the tack to a desired level.

Example 4

The tackifier resins used in our invention are not effective in an SBR system. When such a resin is added to an SBR cement and the resultant cement is used to tackify an SBR stock, there is practically no tackiness, as shown by the tack value of 1 for formulation A in this example.

The SBR stock joined by and used in the cement of Example 4A was a conventional SBR-cis-BR tread stock embodying 103 parts SBR 1712 (which contains 75 parts polymer and 28 parts oil) and 25 parts cis-BR, 70 parts carbon black and 9.5 parts additional oil. The particular Royalene used in the stock joined by and used in the cement of Example 4B had a Mooney viscosity (ML-4@ 212° F.) of 122, an iodine number of 11 and an ethylene-propylene ratio of 61:39. The Royalene stock of Example 4B was compounded exactly as shown for the Royalene stock in Example 1.

|  | Cement formulation | |
| --- | --- | --- |
|  | A | B |
| Resin A above | 6 | 6 |
| Royalene stock |  | 6 |
| SBR stock | 6 |  |
| Cyclohexane | 78 | 78 |
|  | Tackmeter values | |
| Relative tack (400 g. load): |  |  |
| On SBR stock | 1 |  |
| On Royalene stock |  | 100 |

Example 5

Cements containing resins made from phenol, different terpenes and dicyclopentadiene were formulated as follows:

CEMENT FORMULATION

| | Parts |
| --- | --- |
| Resin | 6 |
| Royalene stock (same as in Example 1) | 6 |
| Cyclohexane | 78 |

The cements were tested on the Royalene stock of Example 1 with the following results:

|  | 5A | 5B | 5C | 5D |
| --- | --- | --- | --- | --- |
| Resin | Resin A above | Resin C above | Resin D above | Resin B above |
| Terpene | alpha- and beta-pinenes | alpha-pinene | d-limonene | beta-pinene |
|  | Tackmeter values | | | |
| Relative tack (600 g. load) on Royalene stock of Example 1 | 100 | 18 | 49 | 57 |

Example 6

The following cements were formulated:

|  | Cement formulation | | | |
| --- | --- | --- | --- | --- |
|  | A | B | C | D |
| Royalene stock | 6 | 6 | 6 | 6 |
| Resin (6 parts) | Resin B above | Resin E above | Resin A above | Resin F above |
| Cyclohexane | 78 | 78 | 78 | 78 |
|  | Tackmeter values | | | |
| Relative tack | 59 | 74 | 100 | 52 |

The Royalene stock used in the cement and bonded therewith was compounded as follows:

| | Parts |
|---|---|
| Royalene rubber (Mooney viscosity (ML–4 @ 212° F.) of 95, iodine number 12, and ethylene-propylene ratio of 65:35) | 100 |
| SAF carbon black | 80 |
| RPO–5150 oil | 50 |
| Zinc oxide | 5 |
| Stearic acid | 1 |
| MBT | 0.75 |
| Monex | 1.5 |
| Sulfur | 1.25 |

In the accompanying claims, as will be obvious from this specification, where reference is made to two bodies of EPDM stock bonded together we include the bonding of two surfaces of a single body of such stock.

Example 7

The tackifier resins used in our invention can be used in cements where a portion of the EPDM rubber is replaced by a sulfur-vulcanizable, low-unsaturation rubber incompatible with the EPDM rubber such as butyl rubber. This is illustrated in the example below.

Tackifier cements were made as follows:

Sixty parts each of EPDM–butyl 218 rubber stocks and a control with no butyl rubber having the following formulations:

| | A | B | C | D |
|---|---|---|---|---|
| Royalene rubber [1] | 100 | 90 | 80 | 70 |
| Butyl 218 rubber [2] | 0 | 10 | 20 | 30 |
| Circosol 2XH hydrocarbon extending oil | 45 | 45 | 45 | 45 |
| SAF carbon black | 80 | 80 | 80 | 80 |
| Zinc oxide | 5.0 | 5.0 | 5.0 | 5.0 |
| Stearic acid | 1.0 | 1.0 | 1.0 | 1.0 |
| MBT (mercaptobenzothiazole) | 0.75 | 0.75 | 0.75 | 0.75 |
| Tetramethylthiuram monosulfide (Monex) | 1.5 | 1.5 | 1.5 | 1.5 |
| Sulfur | 3.0 | 3.0 | 3.0 | 3.0 |

[1] (Registered trademark) The particular "Royalene" used in the cements was an EPDM rubber made with dicyclopentadiene as the third monomer and had a Mooney (ML–4 at 265° F.) viscosity of 102, an iodine number of 7.9, and an ethylene-propylene weight ratio of 66:34.

[2] The particular "Butyl" used in cements B, C, and D was a copolymer of isoprene and isobutylene with a Mooney (ML–4 at 212° F.) viscosity of 71, mole percent unsaturation of 1.5 and a specific gravity of 0.92.

were shaken overnight with 60 parts of Resin A above prepared from phenol, alpha-pinene, beta-pinene and dicyclopentadiene in 780 parts of cyclohexane. The mixtures were then further dispersed in the solvent by rapid mixing, as with a homogenizer. The products were smooth, black liquids of an easily pourable viscosity.

The tackifier cements were painted on unvulcanized EPDM stocks having the following formulation:

| | Parts |
|---|---|
| Royalene rubber [1] | 100.0 |
| HAF carbon black | 36.0 |
| FEF carbon black | 36.0 |
| Circosol 2XH hydrocarbon extending oil | 40.0 |
| Zinc oxide | 5.0 |
| Stearic acid | 1.0 |
| MBT (mercaptobenzothiazole) | 0.5 |
| Tetramethylthiuram disulfide | 1.5 |
| Sulfur | 2.0 |
| Compounded Mooney viscosity (ML–4 @ 212° F.) | 57 |

[1] (Registered trademark) The particular "Royalene" used in the stocks was an EPDM rubber made with dicyclopentadiene as the third monomer and had a Mooney (ML–4 at 212° F.) viscosity of 85, an iodine number of 13.0, and an ethylene-propylene ratio of 67:33.

After 24 hours drying, tack was measured on the tackmeter as described above. Cured adhesion pads were made and tested as described above. The data obtained are also presented below.

| Rubber in Cement | Cement Formulations | | | |
|---|---|---|---|---|
| | A | B | C | D |
| Royalene | 100 | 90 | 80 | 70 |
| Butyl 218 | 0 | 10 | 20 | 30 |
| Relative Tack (under 700 g. load) on Royalene stock | 100 | 91 | 60 | 77 |
| Separation rate (inch/min.) | 0.014 | | | 0.16 |

Using the principles of our invention we can join a stock made with a blend of EPDM rubber and a compatible, sulfur-vulcanizable, low-unsaturation rubber such as butyl rubber to a straight EPDM stock or to another stock made with a blend of the type just referred to.

Having thus described our invention, what we claim and desire to protect by Letters Patent is:

1. An article of manufacture comprising two sulfur-vulcanizable ethylene-propylene-polyene terpolymer rubber bodies bonded together by the vulcanization of a composite of said bodies with a thin bonding layer interposed therebetween, said bonding layer being a mixture of (A) a sulfur-vulcanizable ethylene-propylene-polyene terpolymer rubber, (B) compounding and vulcanizing ingredients for component A, and (C) a resin which is the reaction product of (1) a phenol selected from the group consisting of phenol and alkyl substituted phenols having at least one of the ortho and para positions open, (2) a terpene, and (3) a cyclic polyene, other than reactant 2, selected from the group consisting of monocyclic and polycyclic hydrocarbons having at least two non-conjugated double bonds, the reactant 1 being used in an amount equal to 0.1 to 5 moles per 5 moles of reactant 3 and the molar ratio of reactant 2 to reactant 3 varying from 1:5 to 5:1 wherein the reaction is carried out in the presence of a Friedel-Crafts catalyst and reactant 3 is added last.

2. A fabric-reinforced pneumatic tire embodying the construction set forth in claim 1.

3. An article of manufacture as set forth in claim 1 wherein said phenol is phenol per se.

4. An article of manufacture as set forth in claim 1 wherein said terpene is a mixture of alpha-pinene and beta-pinene.

5. An article of manufacture as set forth in claim 1 wherein said cyclic polyene is dicyclopentadiene.

6. A tackifier and bonding cement adapted to impart tack to the surface of sulfur-vulcanizable ethylene,propylene-polyene terpolymer rubber stocks and to effect bonding of two such stocks upon vulcanization of said stocks while juxtaposed with a thin layer of said cement therebetween, said cement comprising (A) an unvulcanized sulfur-vulcanizable ethylene-propylene-polyene terpolymer rubber, (B) compounding and vulcanizing ingredients for component A, and (C) a resin which is the reaction product of (1) a phenol selected from the group consisting of phenol and alkyl substituted phenols having at least one of the ortho and para positions open, (2) a terpene, and (3) a cyclic polyene, other than reactant 2, selected from the group consisting of monocyclic and polycyclic hydrocarbons having at least two non-conjugated double bonds, components (A) and (C) being dissolved in a volatile organic solvent, the reactant 1 being used in an amount equal to 0.1 to 5 moles per 5 moles of reactant 3 and the molar ratio of reactant 2 to reactant 3 varying from 1:5 to 5:1 wherein the reaction is carried out in the presence of a Friedel-Crafts catalyst and reactant 3 is added last.

7. A cement as set forth in claim 6 wherein said phenol is phenol per se.

8. A cement as set forth in claim 6 wherein said terpene is a mixture of alpha-pinene and beta-pinene.

9. A cement as set forth in claim 6 wherein said cyclic polyene is dicyclopentadiene.

10. A cement as set forth in claim 6 wherein the level of total solids in said cement ranges from 5 to 20 parts by weight per 100 parts thereof.

11. The method which comprises applying to the surface of a body of sulfur-vulcanizable ethylene-propylene-polyene terpolymer rubber stock a layer of cement comprising (A) an unvulcanized sulfur-vulcanizable ethylene-propylene-polyene terpolymer rubber, (B) compounding and vulcanizing ingredients for A, and (C) a resin which is the reaction product of (1) a phenol selected from the group consisting of phenol and alkyl substituted phenols having at least one of the ortho and para positions open, (2) a terpene, and (3) a cyclic polyene, other than reactant 2, selected from the group consisting of monocyclic and polycyclic hydrocarbons having at least two non-conjugated double bonds, components A and C being dissolved in a volatile organic solvent, allowing said solvent to at least partially evaporate, juxtaposing the thus-coated body with another body of sulfur-vulcanizable ethylene-propylene-polyene terpolymer stock, at least one of said bodies being unvulcanized, with the coating deposited from said cement therebetween, and vulcanizing the resulting composite, the reactant 1 being used in an amount equal to 0.1 to 5 moles per 5 moles of reactant 3 and the molar ratio of reactant 2 to reactant 3 varying from 1:5 to 5:1 wherein the reaction is carried out in the presence of a Friedel-Crafts catalyst and reactant 3 is added last.

12. A method as set forth in claim 11 for making a fabric-reinforced pneumatic tire.

13. A method as set forth in claim 11 wherein said phenol is phenol per se.

14. A method as set forth in claim 11 wherein said terpene is a mixture of alpha-pinene and beta-pinene.

15. A method as set forth in claim 11 wherein said cyclic polyene is dicyclopentadiene.

16. A method as set forth in claim 11 wherein one of said bodies is a tire ready to be retreaded and the other of said bodies is formed of unvulcanized tread rubber, and wherein the vulcanizing step effects retreading of said tire.

17. A cement as set forth in claim 6 which also contains butyl rubber.

References Cited

FOREIGN PATENTS 1,364,247  5/1964  France.

ROBERT F. BURNETT, *Primary Examiner.*

R. J. ROCHE, *Assistant Examiner.*